(12) United States Patent
Choi

(10) Patent No.: US 8,681,235 B2
(45) Date of Patent: Mar. 25, 2014

(54) APPARATUS FOR PROCESSING DIGITAL IMAGE SIGNAL THAT OBTAINS STILL IMAGE AT DESIRED POINT IN TIME AND METHOD OF CONTROLLING THE APPARATUS

(75) Inventor: Jun-kwon Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 13/295,255

(22) Filed: Nov. 14, 2011

(65) Prior Publication Data

US 2012/0162456 A1    Jun. 28, 2012

(30) Foreign Application Priority Data

Dec. 23, 2010 (KR) .......... 10-2010-0133722

(51) Int. Cl.
*H04N 5/225* (2006.01)

(52) U.S. Cl.
USPC ............... 348/220.1; 348/222.1; 348/208.14

(58) Field of Classification Search
USPC ............... 348/208.14, 220.1, 222.1, 231.99, 348/231.2
See application file for complete search history.

(56) References Cited

U.S. PATENT DOCUMENTS

| 2004/0051793 | A1* | 3/2004 | Tecu et al. | 348/231.99 |
| 2008/0309778 | A1* | 12/2008 | Tabatabai et al. | 348/222.1 |
| 2009/0091633 | A1* | 4/2009 | Tamaru | 348/208.14 |
| 2010/0295966 | A1* | 11/2010 | Furlan | 348/231.2 |

* cited by examiner

*Primary Examiner* — Gevell Selby
(74) *Attorney, Agent, or Firm* — Drinker Biddle & Reath LLP

(57) ABSTRACT

An apparatus for processing a digital image signal and a method of controlling the same includes: a storage unit that stores a video file including a first video with a first resolution; a resizing unit that generates a second video with a second resolution that is lower than the first resolution; a determining unit that determines whether any of one or more frames of the second video satisfies a preset condition; and a still image generating unit that generates a still image by capturing a frame of the first video corresponding to a frame of the second video satisfying the condition. Accordingly, a user may more precisely obtain a high-quality still image with respect to a point in time desired by the user.

18 Claims, 6 Drawing Sheets

APPARATUS FOR PROCESSING DIGITAL IMAGE SIGNAL THAT OBTAINS STILL IMAGE AT DESIRED POINT IN TIME AND METHOD OF CONTROLLING THE APPARATUS

CROSS-REFERENCE TO RELATED PATENT APPLICATION

This application claims the priority benefit of Korean Patent Application No. 10-2010-0133722, filed on Dec. 23, 2010, in the Korean Intellectual Property Office, the disclosure of which is incorporated herein in its entirety by reference.

BACKGROUND

1. Field

Embodiments relate to an apparatus for processing a digital image signal that may capture a high-quality video and a method of controlling the apparatus.

2. Description of the Related Art

In general, in order to store a frame in a video as a still image, a user selects, captures, and stores the frame at a desired point in time by manipulating a shutter-release button or the like. However, since the video plays back at a frame rate of 30 to 60 fps, when the user confirms a desired frame and presses the shutter-release button, the frame may already have passed. Accordingly, a stored still image may be a blurry image.

SUMMARY

According to an embodiment, an apparatus for processing a digital image signal and a method of controlling the apparatus may more precisely obtain a still image with respect to a point in time desired by a user.

According to an embodiment, an apparatus for processing a digital image signal includes: a storage unit that stores a video file including a first video with a first resolution; a resizing unit that generates a second video with a second resolution that is lower than the first resolution; a determining unit that determines whether any one or more frames of the second video satisfies a preset condition; and a still image generating unit that generates a still image by capturing a frame of the first video corresponding to a frame of the second video satisfying the condition.

The apparatus may further include: a photographing unit that generates the first video with the first resolution; and a video file generating unit that generates the video file including the first video.

The apparatus may further include a restoring unit that restores the video file to derive the first video, wherein the resizing unit scales down the first video derived by the restoring unit to generate the second video.

The apparatus may further include: a face detecting unit that derives a face area by using a face detection algorithm in the frames of the second video; and a focus evaluation value deriving unit that derives a focus evaluation value from the face area, wherein the determining unit determines whether the focus evaluation value is greater than a reference focus evaluation value and determines that a corresponding frame satisfies the preset condition when it is determined that the focus evaluation value is greater than the reference focus evaluation value.

The apparatus may further include a still image file generating unit that generates a still image file including the still image.

The apparatus may further include a display unit that displays the second video.

The second resolution of the second video may correspond to a resolution of the display unit.

The first resolution of the first video may be equal to or higher than a high definition (HD) resolution, and the second resolution of the second video may be equal to a video graphics array (VGA) resolution. The first resolution may be 1920× 1080, but this should not be construed as limiting. The second resolution may be 640×480, but this should not be construed as limiting.

The still image may have the first resolution.

According to another embodiment, a method of controlling an apparatus for processing a digital image signal includes: storing a video file including a first video with a first resolution; generating a second video with a second resolution that is lower than the first resolution; determining whether any one or more frames of the second video satisfies a preset condition; and generating a still image by capturing a frame of the first video corresponding to a frame of the second video satisfying the preset condition.

The method may further include: generating the first video with the first resolution; and generating the video file including the first video.

The method may further include restoring the video file to derive the first video, wherein the generating of the second video includes generating the second video by scaling the first video down.

The method may further include: deriving a face area by using a face detection algorithm in the frames of the second video; and deriving a focus evaluation value from the face area, wherein the determining whether any of the frames of the second video satisfies the preset condition includes determining whether the focus evaluation value is greater than a reference focus evaluation value and determining that a corresponding frame satisfies the preset condition when it is determined that the focus evaluation value is greater than the reference focus evaluation value.

The method may further include generating a still image file including the still image.

The method may further include displaying the second video on a display unit.

The second resolution of the second video may correspond to a resolution of the display unit.

The first video may have a first resolution that is equal to or higher than an HD resolution, and the second video may have a second resolution that is equal to a VGA resolution.

The still image may have the first resolution of at least an HD class.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings. In the following embodiments, a digital camera is illustrated as an apparatus for processing a digital image signal. However, this should not be construed as limiting, and any of digital devices such as a camcorder, a personal digital assistant (PDA), a smart phone, a digital picture frame, and a portable multimedia player (PMP) may be used.

Figure 1:
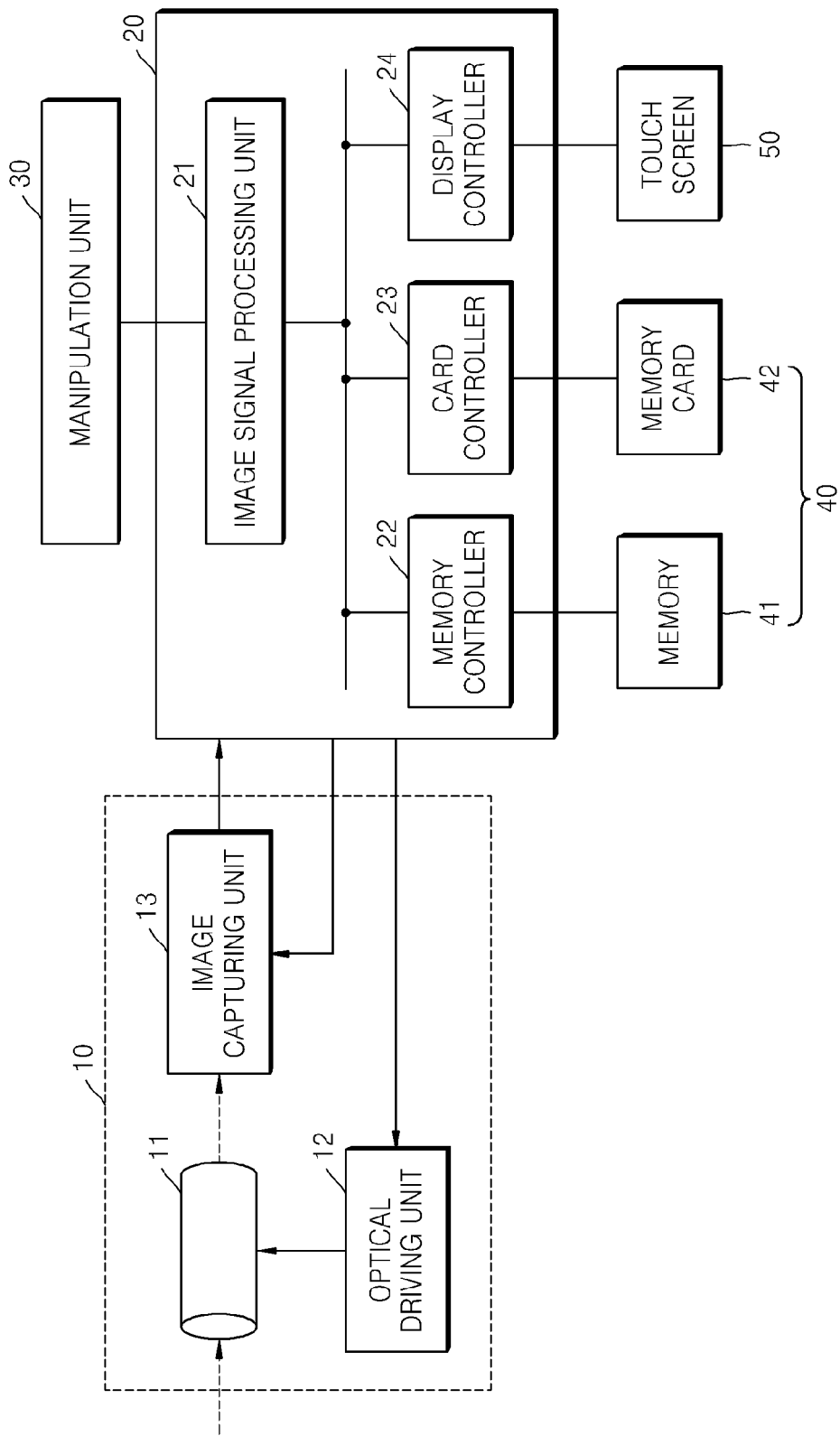
FIG. 1 is a block diagram illustrating an apparatus for processing a digital image signal, e.g., a digital camera, according to an embodiment.

FIG. 1 is a block diagram illustrating an apparatus for processing a digital image signal, e.g., a digital camera, according to an embodiment.

Referring to FIG. 1, the apparatus includes a photographing unit 10, a camera control unit 20, a manipulation unit 30, a storage unit 40, and a touch screen 50.

The image capturing unit 10 includes an optical unit 11, an optical driving unit 12 for driving the optical unit 11, and an image capturing unit 13.

The optical unit 11 includes an image-forming lens system for collecting an optical signal from an object to be photographed, a shutter, and an iris diaphragm. The image-forming lens system includes a focus lens for adjusting a focal point, and a zoom lens for adjusting a focal length.

The optical driving unit 12 includes a focus lens driving unit for adjusting a position of the focus lens, an iris diaphragm driving unit for adjusting a diameter of the iris diaphragm, and a shutter driving unit for opening or closing the shutter.

The image capturing unit 13 includes an image capturing device that captures light passing through an image-forming optical system of an interchangeable lens to generate an image signal. The image capturing device may include a plurality of photoelectric conversion units arranged in a matrix pattern, and vertical or/and horizontal transfer lines for moving electric charges from the photoelectric conversion units in synchronization with a timing signal to derive an image signal. The image capturing device may be a charge-coupled device (CCD) sensor, or a complementary metal oxide semiconductor (CMOS) sensor. If the image capturing device is a CCD sensor, the image capturing unit 13 may further include a correlated double sampling/amplifier (CDS/AMP) for removing low frequency noise included in an electrical signal output from the image capturing device and amplifying the electrical signal to an arbitrary level, and an analog-to-digital (A/D) converter for converting the electrical signal output from the CDS/AMP into a digital signal.

Also, the apparatus includes the camera control unit 20. The camera control unit 20 includes an image signal processing unit/central processing unit (CPU) 21.

The image signal processing unit/CPU 21 may calculate an auto white balance (AWB) evaluation value, an auto exposure (AE) evaluation value, and an auto focusing (AF) evaluation value for an image signal obtained by the image capturing unit 13, and may perform appropriate white balance control, exposure control, and auto focus control according to the calculated evaluation values. Also, the image signal processing unit/CPU 21 may perform various operations, for example, object detection such as face detection and scene detection, on the image signal. Also, the image signal processing unit/CPU 21 may perform image processing for recordkeeping and for display. For example, the image signal processing unit/CPU 21 may perform image processing for display such as gamma correction, color filter array interpolation, color matrix, color correction, or color enhancement. Also, the image signal processing unit/CPU 21 may perform image processing for recordkeeping such as joint photographic experts group (JPEG) compression or Lempel-Ziv-Welch (LZW) compression.

Also, when a video file including a first video with a first resolution is stored in the storage unit 40, the image signal processing unit/CPU 21 generates a still image by determining whether a second video with a second resolution that is lower than the first resolution includes a frame satisfying a preset condition, and capturing a frame of the first video corresponding to a frame of the second video satisfying the condition, which will be explained in further detail with reference to FIGS. 2 through 4.

Also, the camera control unit 20 includes a memory controller 22, a card controller 23, and a display controller 24.

The memory controller 22 may temporarily store captured images or various information in a memory 41, or output the captured images or the various information from the memory 41. Also, the memory controller 22 may read out program information stored in the memory 41. The memory 41, which may include a buffer memory for temporarily storing the captured images or various information, may be a dynamic random access memory (DRAM), a synchronous dynamic random access memory (SDRAM), or the like. Also, the memory 41 may include a flash memory, a read-only memory (ROM), or the like for storing a program.

The card controller 23 may store an image film in a memory card 42 and read out the image file from the memory card 42. The card controller 23 may control various information as well as the image file to be read out and stored. The memory card 42 may be a secure digital (SD) card. Although the memory card 42 is used as a storage medium in FIG. 1, the present embodiment is not limited thereto, and an image file and various information may be stored in a recording medium such as an optical disc (e.g., a compact disc (CD), a digital versatile disc (DVD), or a blu-ray disc), a magneto-optical disc, or a magnetic disc. If a recording medium such as an optical disc, a magneto-optical disc, or a magnetic disc is used, a device for reading the recording medium may be further provided.

The storage unit 40 for storing a video file may include the memory 41 and the memory card 42. The video file may be stored in the memory card 42 for recordkeeping, and when the video file is read, the video file may be stored in the memory 41, that is, a buffer memory.

Also, the display controller 24 may control an image to be displayed on the touch screen 50. The touch screen 50 may include a touch panel mounted on a display device such as a liquid crystal display (LCD) or an organic light-emitting diode (OLED). In FIG. 1, the touch screen 50 is used as a display unit.

Also, the apparatus includes the manipulation unit 30 for inputting a user's manipulation signal. The manipulation unit 30 may include members for enabling the user to manipulate the apparatus or to set various functions during photographing. For example, the manipulation unit 30 may be, for example, buttons, keys, a touch panel, a touch screen, or a dial. The manipulation unit 30 may input the user's manipulation signal to turn on or off power, start or stop photographing, start, stop, or search playback, drive an optical system, change a mode, manipulate a menu, or select a function. For example, a shutter button may be pressed by the user halfway or fully, or released. When the shutter button is pressed halfway (S1), a focus control start signal is output, and when the shutter button is released, focus control is terminated. When the shutter button is pressed fully (S2), a photographing start signal may be output. The photographing start signal may be transmitted to the image signal processing unit/CPU 21 or the like, and a corresponding element may be accordingly driven.

Figure 2:
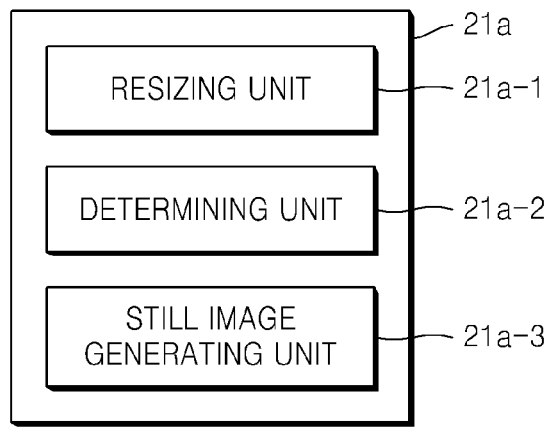
FIG. 2 is a block diagram illustrating an image signal processing unit/central processing unit (CPU) of the apparatus of FIG. 1, according to an embodiment.

FIG. 2 is a block diagram illustrating an image signal processing unit/CPU 21a of the apparatus of FIG. 1, according to an embodiment. The following explanation will be made with reference to FIGS. 1 and 2.

It is assumed that a video file including a first video with a first resolution is stored in the storage unit 40 (see FIG. 1). The image signal processing unit/CPU 21a of FIG. 2 includes a resizing unit 21a-1 that generates a second video with a second resolution that is lower than the first resolution, a determining unit 21a-2 that determines whether any of frames of the second video satisfies a preset condition, and a still image generating unit 21a-3 that generates a still image by capturing a frame of the first video corresponding to a frame of the second video satisfying the preset condition.

Figure 3:
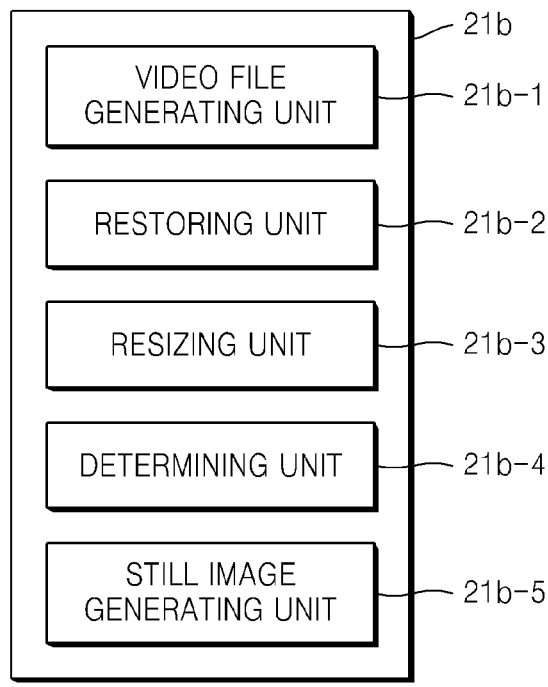
FIG. 3 is a block diagram illustrating an image signal processing unit/CPU of the apparatus of FIG. 1, according to another embodiment.

FIG. 3 is a block diagram illustrating an image signal processing unit/CPU 21b of the apparatus of FIG. 1, according to another embodiment.

Referring to FIGS. 1 and 3, the image capturing unit 10 (see FIG. 1) may generate a first video with a first resolution. For example, the first video may include high quality frames with, for example, a 1920×1080 full-high definition (HD) resolution that may be played back at a frame rate of 30 to 60 fps. However, the present embodiment is not limited thereto, and the first video may include frames with resolutions equal to or higher than an HD resolution.

The image signal processing unit/CPU 21b of FIG. 3 may include a video file generating unit 21b-1 that generates a video file including the first video.

The image signal processing unit/CPU 21b further includes a restoring unit 21b-2 that restores the video file to derive the first video.

In this case, a resizing unit 21b-3 may generate a second video by scaling down the first video derived by the restoring unit 21b-2. The second video, which is composed of frames with a resolution high enough to be displayed on the display unit of the apparatus, may be generated by scaling down the frames of the first video to, for example, a video graphics array (VGA) (640×480) resolution.

A determining unit 21b-4 may determine whether any of frames of the second video satisfies a predetermined condition. The predetermined condition is a condition desired by the user during photographing. For example, a point in time when a face area is detected and is in focus may be set as the predetermined condition.

If a frame of the second video satisfies the predetermined condition, a still image generating unit 21b-5 may generate a still image by capturing a frame of the first video with a high resolution. In further detail, if a frame of the second video satisfies the predetermined condition, a still image may be generated by capturing a frame of the first video corresponding to the frame of the second video satisfying the predetermined condition. A still image of a frame of the first video with a high resolution or of a frame of the second video representing the same scene may be generated.

Figure 4:
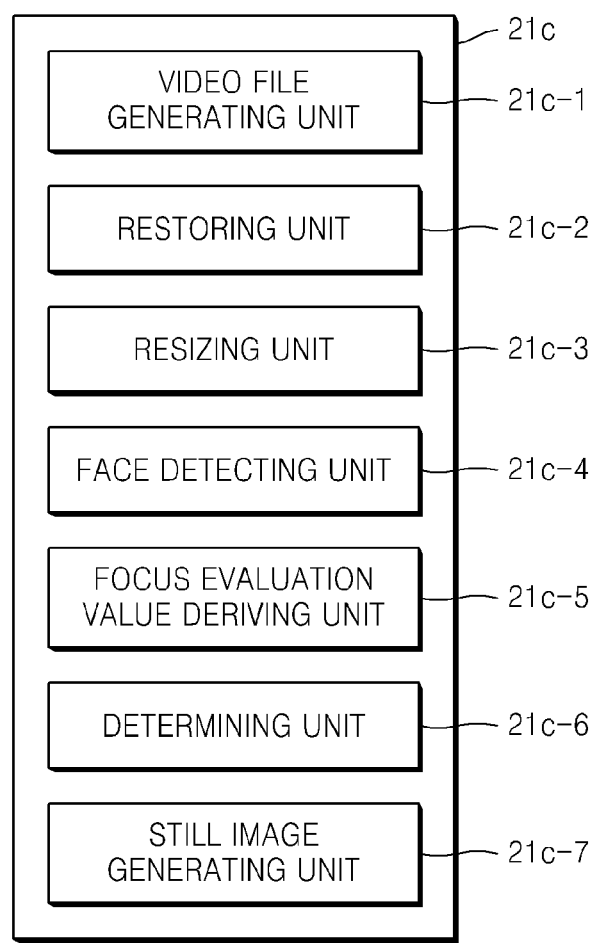
FIG. 4 is a block diagram illustrating an image signal processing unit/CPU of the apparatus of FIG. 1, according to another embodiment.

FIG. 4 is a block diagram illustrating an image signal processing unit/CPU 21c of the apparatus of FIG. 1, according to another embodiment.

Referring to FIGS. 1 and 4, the image signal processing unit/CPU 21c includes a video file generating unit 21c-1 that generates a video file including a first video, a restoring unit 21c-2 that restores the video file to derive the first video, a resizing unit 21c-3 that generates a second video by scaling down the first video derived by the restoring unit 21c-2, a face detecting unit 21c-4 that detects a face area by using a face detection algorithm in frames constituting the second video, a focus evaluation value deriving unit 21c-5 that derives a focus evaluation value from the face area, a determining unit 21c-6 that determines whether the focus evaluation value satisfies a predetermined condition, and a still image generating unit 21c-7 that generates a still image by capturing a frame of the first video corresponding to a frame of the second video having the focus evaluation value if the focus evaluation value satisfies the predetermined condition.

The determining unit 21c-6 may determine whether the focus evaluation value is a focus evaluation value corresponding to an in-focus state. Alternatively, the determining unit 21c-6 may determine whether the focus evaluation value is a maximum value or a local maximum value. Alternatively, the determining unit 21c-6 may determine whether the focus evaluation value is greater than a reference focus evaluation value.

According to the afore-described embodiments, a high-quality still image at a desired point in time may be obtained from a high-quality video. In detail, unlike in a case where a user confirms an object to be photographed and then presses a shutter-release button to capture a still image, since a still image is generated by capturing a frame satisfying a specific condition at a desired point in time in a high-quality video previously captured, a still image can be obtained more precisely with respect to a point in time desired by a user. Also, since whether the specific condition is satisfied is determined fast by using frames of a video obtained by scaling a high-quality video down, a still image can be obtained more precisely with respect to a point in time desired by a user.

Figure 5:
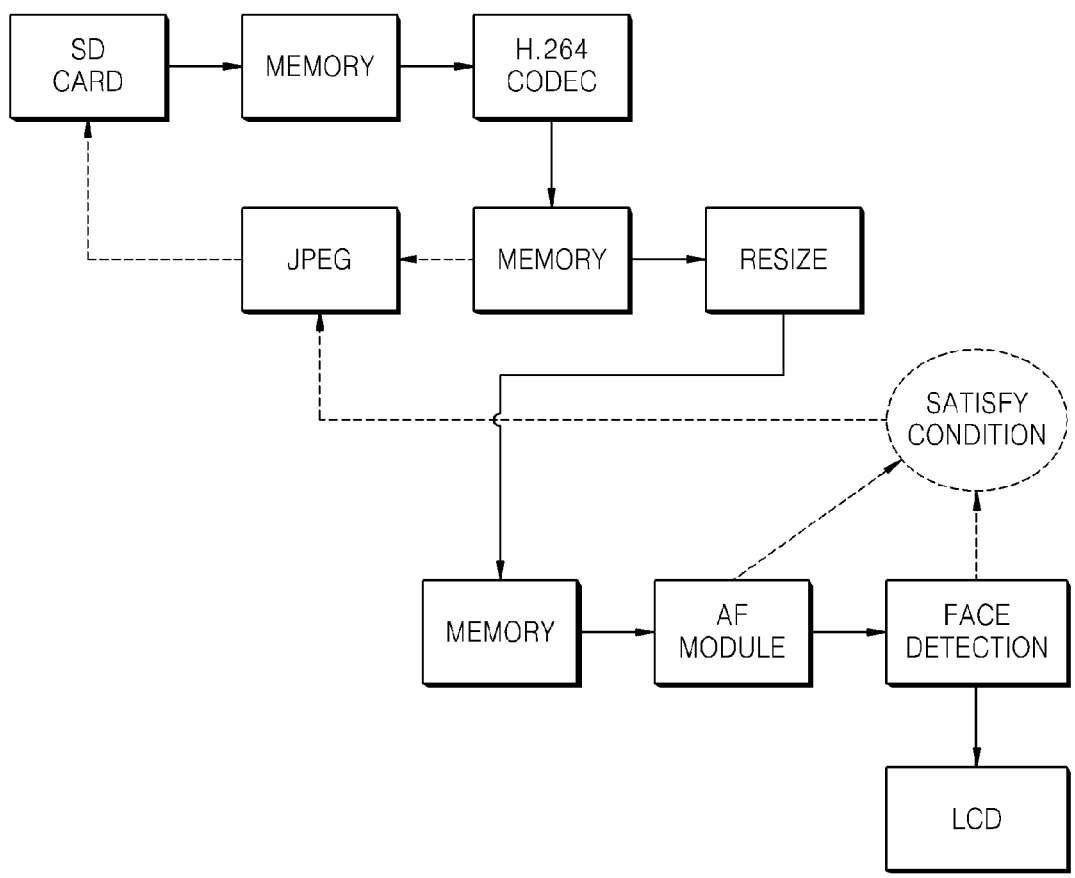
FIG. 5 is a block diagram for explaining an operation of an apparatus for processing a digital image signal, according to an embodiment.

FIG. 5 is a block diagram for explaining an operation of an apparatus for processing a digital image signal, according to an embodiment.

Referring to FIG. 5, when a user selects a video file, the video file is read out from an SD card, and is stored in a double data rate (DDR) memory. The video file is then converted by an H.264 codec into frame data in which frames may be detected. That is, the H.264 codec generates a frame by restoring the video file. Frame data corresponding to the frame is stored in the DDR memory. Although the H.264 codec is used in FIG. 5, the present embodiment is not limited thereto, and another video codec may be used.

If the frame data is a video with the same resolution as that of an original video, for example, a 1080p video, a resolution of each of the frames of the video is 1920×1080. The resolution (1920×1080) of each frame of the video may be too high to perform face detection and auto focusing (AF) at a frame rate of 30 to 60 fps. Accordingly, a resizing unit scales the resolution of the frames down to frames with, for example, a VGA (640×480) resolution, which may be processed in real time. Frame data corresponding to the downscaled frames is stored in the DDR memory.

Since the downscaled frames are the same as images input to an image capturing device in a conventional live view mode, a face detection unit may detect a face area, and an AF module determines whether a specific condition is satisfied by calculating a focus evaluation value. That is, a face area may be detected and a focus evaluation value may be derived in each downscaled frame. Accordingly, a focus evaluation value is derived from a face area, and it is determined whether the focus evaluation value is greater than a reference focus evaluation value. If it is determined that the focus evaluation value is greater than the reference focus evaluation value, a corresponding frame may be an image with a sufficient degree of clarity that may be stored as a still image. A JPEG unit may generate a JPEG still image file by capturing a frame with a high focus evaluation value from among frames restored by the H.264 codec and stored in the DDR memory. The still image file may be stored in the SD card. The downscaled frames may also be displayed on an LCD.

Methods of processing a digital image signal according to various embodiments will be explained with reference to FIGS. 6 and 7.

Figure 6:
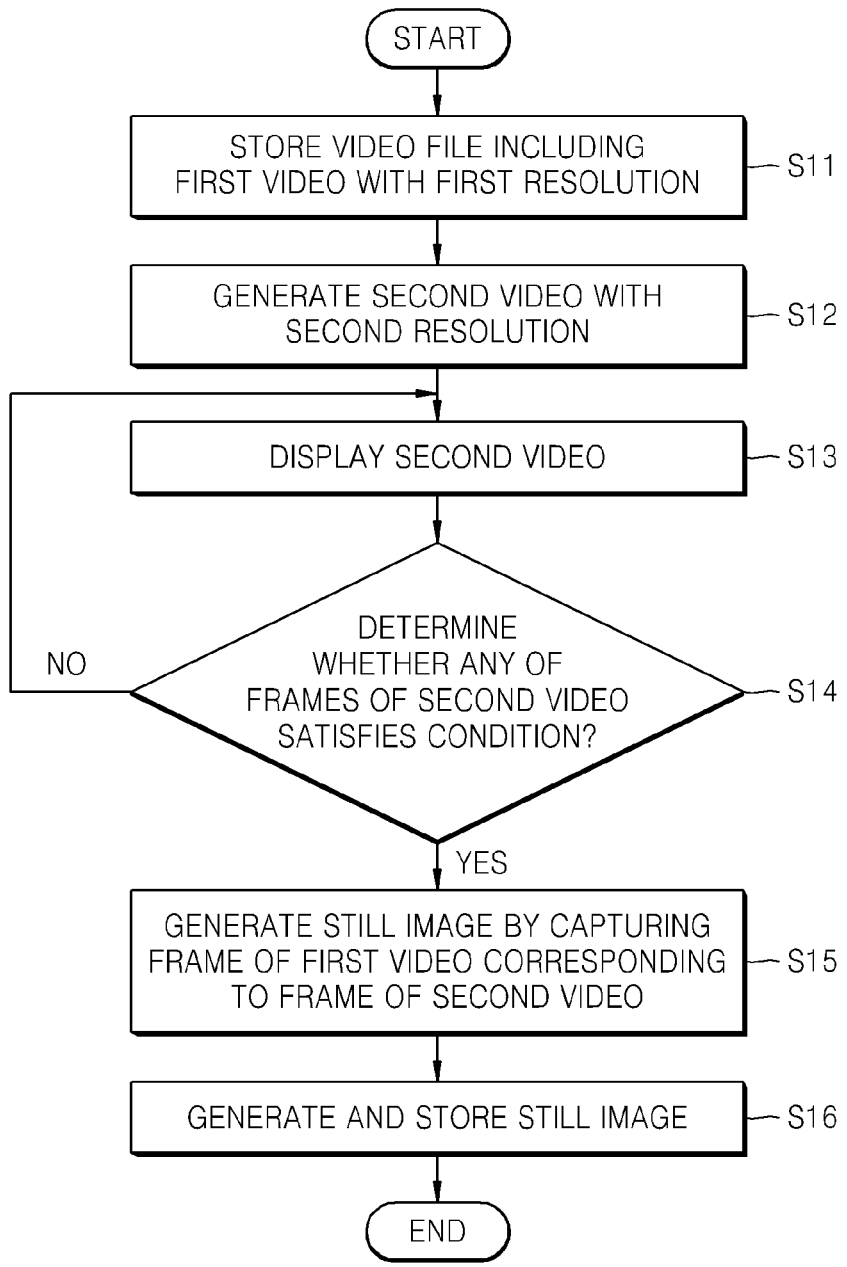
FIG. 6 is a flowchart illustrating a method of processing a digital image signal, according to an embodiment.

FIG. 6 is a flowchart illustrating a method of processing a digital image signal, according to an embodiment.

Referring to FIG. 6, in operation S11, a video file including a first video with a first resolution is stored.

In operation S12, a second video with a second resolution that is lower than the first resolution is generated.

In operation S13, the second video may be displayed. However, the displaying of the second video may be omitted.

In operation S14, it is determined whether any of frames constituting the second video satisfies a preset condition. For example, focus evaluation values of the frames of the second video may be derived from a face area detected by using a face detection algorithm, and then it may be determined whether any of the focus evaluation values exceeds a reference focus evaluation value. For example, it may be determined whether a focus evaluation value is a maximum value, a local maximum value, or a focus evaluation value corresponding to an in-focus state.

If any of the frames constituting the second video satisfies the preset condition, for example, if any of the focus evaluation values exceeds the reference focus evaluation value, the method proceeds to operation S15. In operation S15, a still image is generated by capturing a frame of the first video corresponding to a frame of the second video having a focus evaluation value that exceeds the reference focus evaluation value.

In operation S16, a still image file including the still image is generated and stored.

Accordingly, a user may more precisely obtain a still image with respect to a point in time desired by the user.

Figure 7:
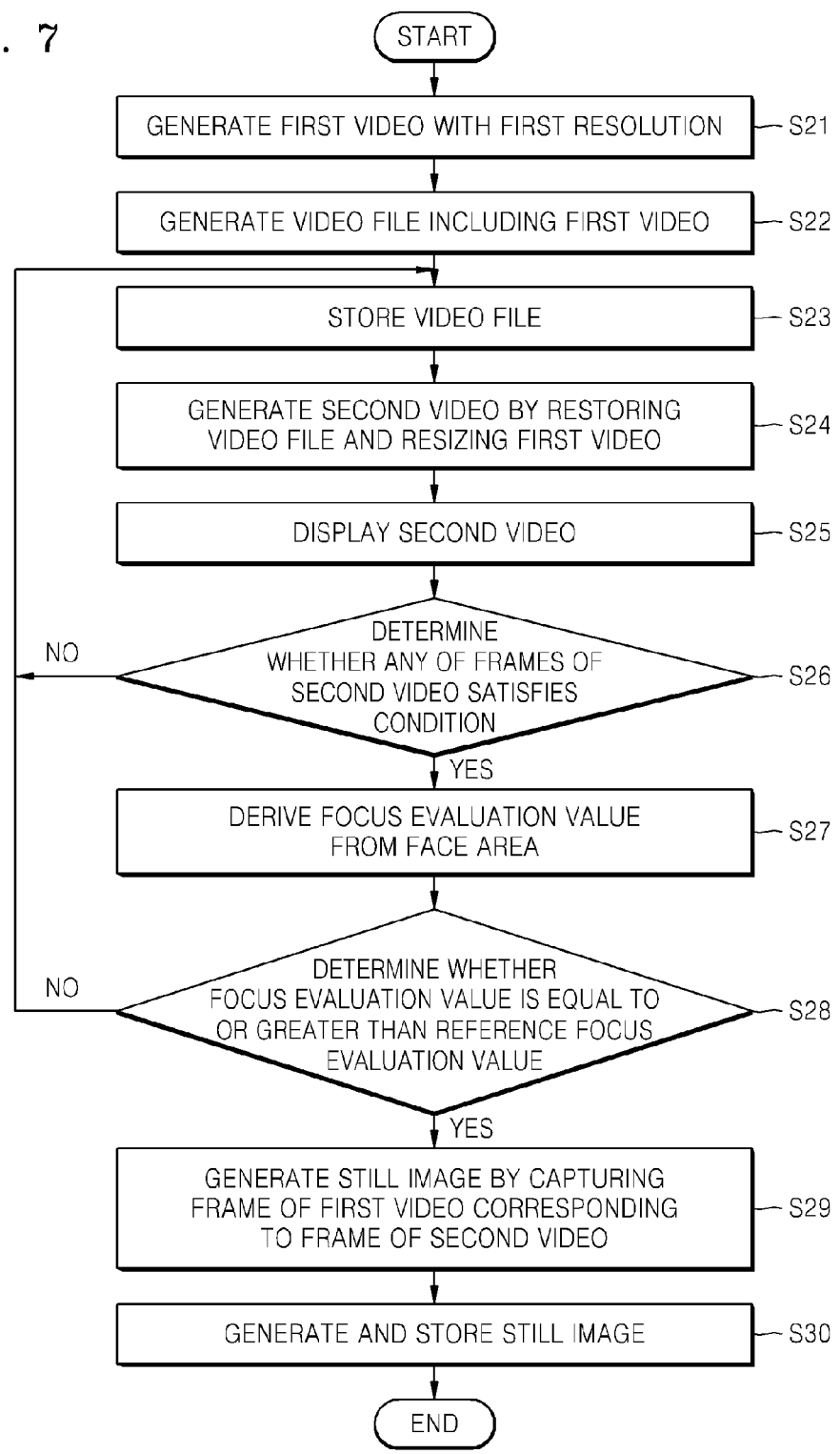
FIG. 7 is a flowchart illustrating a method of processing a digital image signal, according to another embodiment.

FIG. 7 is a flowchart illustrating a method of processing a digital image signal, according to another embodiment.

Referring to FIG. 7, in operation S21, a first video with a first resolution is generated. The first video with the first resolution corresponds to an original video input to an image capturing device. A higher quality video may be obtained as a number of pixels of the image capturing device increases. For example, a first video with a full-HD or higher resolution may be generated.

In operation S22, a video file is generated by compressing the first video. In operation S23, the video file is stored.

In operation S24, a second video with a resolution that is lower than the first resolution is generated by restoring the video file and resizing the first video. For example, a second video with a VGA resolution may be generated by scaling the first video with the full-HD or higher resolution down.

In operation S25, the second video is displayed. However, the displaying of the second video may be omitted as described above.

In operation S26, it is determined whether any of the frames of the second video satisfies a condition. For example, it is determined whether a face area is detected in frames of the second video. Although the resolution of the first video may be too high to perform AF or face detection at a frame rate of 30 to 60 fps, with respect to the second video obtained by scaling the first video down, whether a face area is detected may be determined fast.

If it is determined that a face area is detected in the frames of the second video, the method proceeds to operation S27. In operation S27, a focus evaluation value is derived from the face area.

In operation S28, it is determined whether the focus evaluation value is equal to or greater than a reference focus evaluation value.

In operation S29, a still image is generated by capturing a frame of the first video corresponding to a frame of the second video having the focus evaluation value greater than the reference focus evaluation value.

In operation S30, a still image file including the still image is generated and stored.

Accordingly, according to the embodiments, since a still image is obtained by capturing a frame when a high-quality video file satisfies a specific condition, a user may more precisely obtain a high-quality still image with respect to a point in time desired by the user.

In addition, as described above, since a still image is generated by determining whether any one or more frames of a video obtained by scaling down a high-quality video previously captured and stored satisfies a preset specific condition, and capturing a frame of the high-quality video at a point in time satisfying the specific condition, an apparatus for processing a digital image signal and a method of controlling the apparatus may more precisely obtain a high-quality still image with respect to a point in time desired by a user.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An apparatus for processing a digital image signal comprising:
   a storage unit that stores a video file comprising a first video with a first resolution;
   a resizing unit that generates a second video with a second resolution that is lower than the first resolution;
   a determining unit that determines whether any one or more frames of the second video satisfies a preset condition; and
   a still image generating unit that generates a still image by capturing a frame of the first video corresponding to a frame of the second video satisfying the condition.

2. The apparatus of claim 1, further comprising:
   a photographing unit that generates the first video with the first resolution; and
   a video file generating unit that generates the video file comprising the first video.

3. The apparatus of claim 1, further comprising a restoring unit that restores the video file to derive the first video,
   wherein the resizing unit scales down the first video derived by the restoring unit to generate the second video.

4. The apparatus of claim 1, further comprising:
   a face detecting unit that derives a face area by using a face detection algorithm in the frames of the second video; and
   a focus evaluation value deriving unit that derives a focus evaluation value from the face area,
   wherein the determining unit determines whether the focus evaluation value is greater than a reference focus evaluation value and determines that a corresponding frame satisfies the preset condition when it is determined that the focus evaluation value is greater than the reference focus evaluation value.

5. The apparatus of claim 1, further comprising a still image file generating unit that generates a still image file comprising the still image.

6. The apparatus of claim 1, further comprising a display unit that displays the second video.

7. The apparatus of claim 6, wherein the second resolution of the second video corresponds to a resolution of the display unit.

8. The apparatus of claim 1, wherein the first resolution of the first video is equal to or higher than a high definition (HD) resolution, and the second resolution of the second video is equal to a video graphics array (VGA) resolution.

9. The apparatus of claim 8, wherein the still image has the first resolution.

10. A method of controlling an apparatus for processing a digital image signal, the method comprising:
    storing a video file comprising a first video with a first resolution;
    generating a second video with a second resolution that is lower than the first resolution;
    determining whether any one or more frames of the second video satisfies a preset condition; and
    generating a still image by capturing a frame of the first video corresponding to a frame of the second video satisfying the preset condition.

11. The method of claim 10, further comprising:
    generating the first video with the first resolution; and
    generating the video file comprising the first video.

12. The method of claim 10, further comprising restoring the video file to derive the first video,
   wherein the generating of the second video comprises generating the second video by scaling the first video down.

13. The method of claim 10, further comprising:
   deriving a face area by using a face detection algorithm in the frames of the second video; and
   deriving a focus evaluation value from the face area,
   wherein the determining whether any one or more frames of the second video satisfies the preset condition comprises determining whether the focus evaluation value is greater than a reference focus evaluation value and determining that a corresponding frame satisfies the preset condition when it is determined that the focus evaluation value is greater than the reference focus evaluation value.

14. The method of claim 10, further comprising generating a still image file comprising the still image.

15. The method of claim 10, further comprising displaying the second video on a display unit.

16. The method of claim 15, wherein the second resolution of the second video corresponds to a resolution of the display unit.

17. The method of claim 10, wherein the first resolution of the first video is equal to or higher than an HD resolution, and the second resolution of the second video is equal to a VGA resolution.

18. The method of claim 17, wherein the still image has the first resolution of at least an HD class.

\* \* \* \* \*